United States Patent
Langhammer

(10) Patent No.: US 10,417,902 B2
(45) Date of Patent: Sep. 17, 2019

(54) METHOD FOR OPERATING A DOMESTIC APPLIANCE

(71) Applicant: Miele & Cie. KG, Guetersloh (DE)

(72) Inventor: Nils Langhammer, Verl (DE)

(73) Assignee: MIELE & CIE. KG, Guetersloh (DE)

( * ) Notice: Subject to any disclaimer, the term of this patent is extended or adjusted under 35 U.S.C. 154(b) by 0 days.

(21) Appl. No.: 15/968,770

(22) Filed: May 2, 2018

(65) Prior Publication Data

US 2018/0330603 A1 Nov. 15, 2018

(30) Foreign Application Priority Data

May 9, 2017 (DE) .................... 10 2017 109 935

(51) Int. Cl.
| | |
|---|---|
| *G08C 17/02* | (2006.01) |
| *F24C 7/08* | (2006.01) |
| *G01S 13/00* | (2006.01) |
| *G01S 13/04* | (2006.01) |
| *G01S 13/56* | (2006.01) |
| *H04L 12/28* | (2006.01) |
| *G01S 13/46* | (2006.01) |

(52) U.S. Cl.
CPC ............ *G08C 17/02* (2013.01); *F24C 7/08* (2013.01); *G01S 13/003* (2013.01); *G01S 13/04* (2013.01); *G01S 13/56* (2013.01); *H04L 12/2816* (2013.01); *G01S 2013/462* (2013.01); *G08C 2201/91* (2013.01); *H04L 2012/2841* (2013.01)

(58) Field of Classification Search
CPC .............. G08C 17/02; G08C 2201/93; G08C 2201/30; G08C 2201/20; G08C 2201/92; G08C 23/04; G08C 2201/32; G08C 2201/40; G08C 2201/42

USPC ......................................................... 340/12.5
See application file for complete search history.

(56) References Cited

U.S. PATENT DOCUMENTS

| | | | | |
|---|---|---|---|---|
| 7,295,119 | B2 * | 11/2007 | Rappaport | G06F 17/509 340/5.8 |
| 8,742,894 | B2 * | 6/2014 | Seydoux | H05B 37/0272 340/10.1 |
| 9,804,578 | B2 * | 10/2017 | Deilmann | H04L 12/2827 |
| 10,034,066 | B2 * | 7/2018 | Tran | H04Q 9/00 |
| 10,174,965 | B2 * | 1/2019 | Wang | F24F 11/30 |
| 10,204,505 | B2 * | 2/2019 | Honjo | G08B 25/004 |
| 10,216,248 | B2 * | 2/2019 | Meng | G06F 1/3234 |
| 2014/0015706 | A1 | 1/2014 | Ishihara et al. | |
| 2017/0262103 | A1 | 9/2017 | Falco et al. | |

FOREIGN PATENT DOCUMENTS

DE  10256464 A1  6/2004

\* cited by examiner

*Primary Examiner* — Mark S Blouin
(74) *Attorney, Agent, or Firm* — Leydig, Voit & Mayer, Ltd.

(57) ABSTRACT

A method for operating a domestic appliance includes the steps of: receiving, by means of the domestic appliance, a radio signal from at least one radio transmission source; and determining, by means of the domestic appliance, information on surroundings of the domestic appliance by evaluating a temporal progression of an evaluation signal based on the radio signal and influenced by the surroundings of the domestic appliance. The radio signal is intended for transmission within a local radio network and/or complies with the IEEE 802.11 standard, the IEEE 802.154 standard, or the Bluetooth standard.

17 Claims, 2 Drawing Sheets

METHOD FOR OPERATING A DOMESTIC APPLIANCE

CROSS-REFERENCE TO PRIOR APPLICATION

Priority is claimed to German Patent Application No. DE 10 2017 109 935.2, filed on May 9, 2017, the entire disclosure of which is hereby incorporated by reference herein.

FIELD

The invention relates to a method for operating a domestic appliance, comprising the step receiving, by means of the domestic appliance, a radio signal from at least one radio transmission source.

Furthermore, the invention relates to a control device for a domestic appliance, comprising a receiving unit that is designed to receive a radio signal from at least one radio transmission source.

Moreover, the invention relates to a domestic appliance comprising a control device, and to a system comprising a domestic appliance and at least one radio transmission source that is arranged remotely from the domestic appliance.

BACKGROUND

Information on the surroundings of the domestic appliance is taken into account in a plurality of domestic appliance functions. Domestic appliances that detect movements in their own surroundings and take said movements into account in order to increase operating comfort or operational safety are known, for example. In order to increase the operating comfort, display illumination can for example be activated when a movement is detected in the vicinity of a domestic appliance. In order to increase the operational safety, domestic appliances can for example be switched off if no movement has been detected in the surroundings of the domestic appliance for a long period of time.

In known domestic appliances, various sensors, such as proximity sensors, are used to acquire information on the surroundings. Furthermore, solutions are known in which information on the surroundings can be acquired by means of one or more cameras.

However, the use of additional sensors results in increased hardware costs for the domestic appliance. Moreover, the installation and calibration of the sensors used is often complex, and thus entails an additional cost increase.

SUMMARY

In an embodiment, the present invention provides a method for operating a domestic appliance, comprising the steps of: receiving, using the domestic appliance, a radio signal from at least one radio transmission source; and determining, using the domestic appliance, information on surroundings of the domestic appliance by evaluating a temporal progression of an evaluation signal based on the radio signal and influenced by the surroundings of the domestic appliance, wherein the radio signal is configured for transmission within a local radio network and/or complies with the IEEE 802.11 standard, the IEEE 802.154 standard, or the Bluetooth standard.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
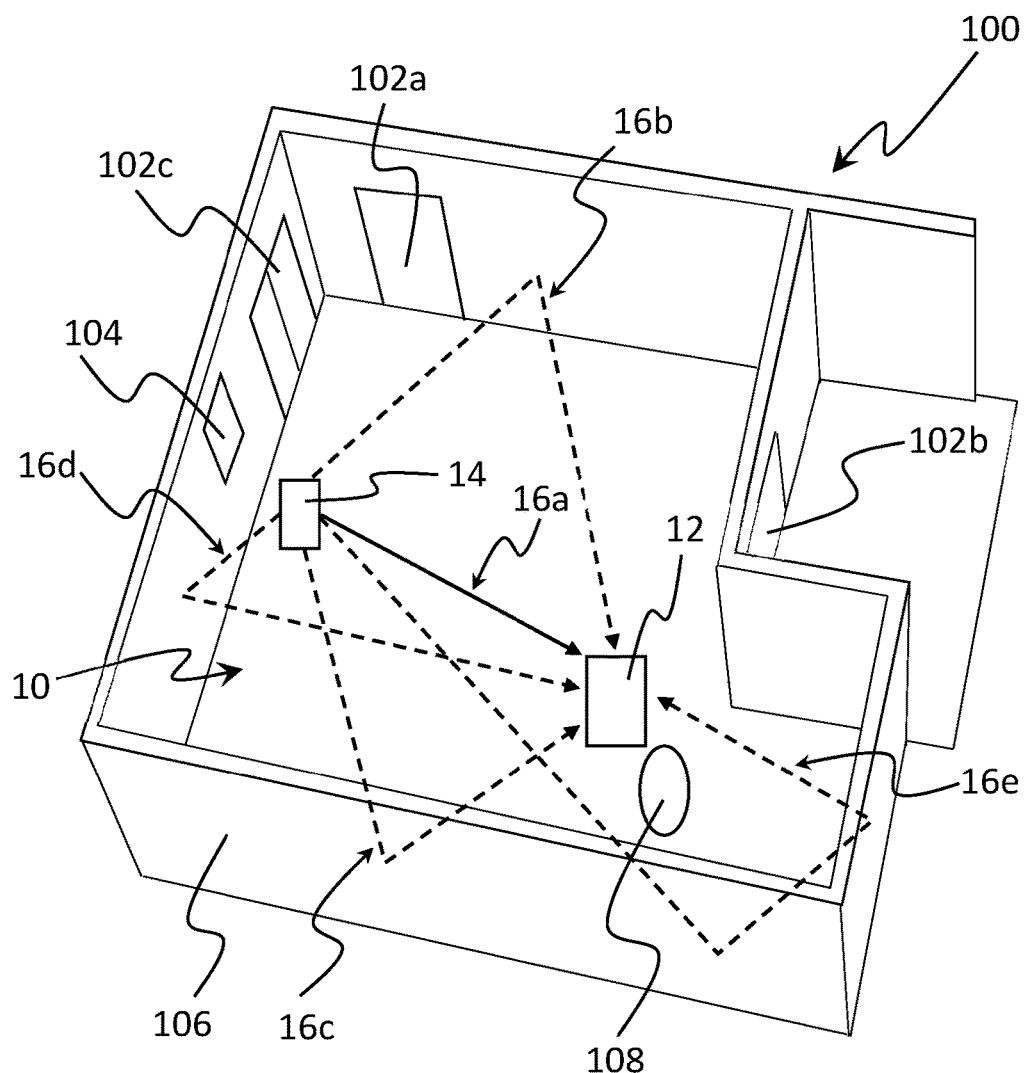
FIG. 1 schematically shows an embodiment of the system according to the invention.

In an embodiment, the present invention provides a method of the kind mentioned at the outset, the domestic appliance determining information on the surroundings of the domestic appliance by evaluating the temporal progression of an evaluation signal based on the radio signal and influenced by the surroundings of the domestic appliance.

The invention makes use of the finding that, by evaluating the temporal progression of an evaluation signal based on the radio signal and influenced by the surroundings of the domestic appliance, no additional sensors are needed in order to make it possible for the domestic appliance to acquire information on the surroundings. Information on the surroundings can therefore be acquired with extremely low additional outlay, in particular in domestic appliances which already have a receiving unit for radio signals for communicating with other appliances, since signals that are already available to the domestic appliance for other communication functions are used to acquire the information on the surroundings.

The radio transmission source is preferably designed as a stationary radio transmission source or does not move when the radio signal is being emitted, for example a temporarily placed mobile terminal. The evaluation signal may correspond to the received radio signal. Alternatively, the evaluation signal can be generated by means of the domestic appliance on the basis of the received radio signal, for example by amplifying and/or smoothing the received radio signal. The evaluation signal can be generated by means of signal filtering using a filter having a finite impulse response. Information on the surroundings of the domestic appliance can also be determined by means of the domestic appliance evaluating the temporal progression of a plurality of evaluation signals. Within the meaning of the invention, the surroundings of the domestic appliance are to be understood as the geographic and in particular immediate surroundings of the domestic appliance.

In a preferred embodiment of the method according to the invention, the surroundings of the domestic appliance are defined as the region within which it is possible for a user of the domestic appliance to operate the domestic appliance locally using the operating elements thereof. For example, the surroundings of the domestic appliance are limited to regions in which a user can touch the domestic appliance. The surroundings can therefore also be delimited for example by walls, in particular house walls, or other spatial separating elements that prevent the domestic appliance from being operated and/or touched. Alternatively, the surroundings of the domestic appliance may also be delimited by a maximum distance from the domestic appliance, the maximum distance preferably being in a range of 1 meter to 10 meters.

In another preferred embodiment of the method according to the invention, evaluating the temporal progression of the evaluation signal comprises examining the evaluation signal for multipath reception and/or for characteristics of multipath reception. The signal emitted by the radio transmission source can reach the domestic appliance via a direct path and also via other paths on account of signal deflections caused by objects. For this reason, the domestic appliance receives a mixed signal by means of multipath reception, from the characteristics of which signal information on the surroundings can be derived.

In a preferred development of the method according to the invention, evaluating the temporal progression of the evaluation signal comprises detecting reflection, refraction, scattering, diffraction, attenuation and/or amplification of the radio signal caused by an object in the surroundings of the domestic appliance before said radio signal is received by the domestic appliance. On account of reflection, refraction, scattering, diffraction, attenuation and/or amplification of the radio signal emitted by the radio transmission source, the radio signal can be received by the domestic appliance multiple times, in a temporally offset manner and/or at different intensities. By using a suitable evaluation routine, the effects mentioned can be identified and converted into information on the surroundings.

Moreover, a method according to the invention is preferred in which determining information on the surroundings of the domestic appliance comprises detecting the presence of an object in the surroundings of the domestic appliance, detecting a movement of an object in the surroundings of the domestic appliance and/or locating an object in the surroundings of the domestic appliance. Alternatively or additionally, determining information on the surroundings of the domestic appliance may comprise identifying an object in the surroundings of the domestic appliance, detecting a state of an object in the surroundings of the domestic appliance and/or detecting a state change in the surroundings of the domestic appliance. The object may for example be a movable or stationary object. Alternatively or additionally, the object may also be a person, in particular a user of the domestic appliance. Detecting a movement of an object in the surroundings of the domestic appliance may for example comprise detecting a person approaching the domestic appliance, detecting a person moving away from the domestic appliance and/or detecting one or more gestures of a person. Locating an object in the surroundings of the domestic appliance may for example comprise detecting the direction of a person relative to the domestic appliance and/or detecting the distance of a person from the domestic appliance. Identifying an object in the surroundings of the domestic appliance may for example comprise identifying a person, in particular on the basis of a detected movement pattern. Detecting a state of an object in the surroundings of the domestic appliance may for example comprise detecting the degree to which a window and/or door in the surroundings of the domestic appliance is/are open.

In another preferred embodiment, the method according to the invention comprises generating the evaluation signal on the basis of the received radio signal. Generating the evaluation signal on the basis of the received radio signal preferably comprises examining an indicator value for the reception strength of the received radio signal, calculating a channel profile of the received radio signal and/or examining the temporal variation of the channel profile. Alternatively or additionally, generating the evaluation signal on the basis of the received radio signal may comprise inverting the channel profile of the received radio signal and/or examining the temporal variation of the inverted channel profile. For example, the evaluation signal is the Receive Signal Strength Indicator (RSSI) value of the received radio signal. Moreover, the evaluation signal may be an equalizer value generated on the basis of the received radio signal.

In an advantageous development, the method according to the invention comprises automatically controlling the domestic appliance on the basis of the information acquired on the surroundings of the domestic appliance. For example, automatically controlling the domestic appliance on the basis of the information acquired on the surroundings of the domestic appliance comprises automatically switching the domestic appliance on and off depending on whether a person has been detected in the vicinity of the domestic appliance. In this connection, it should be understood that switching on the domestic appliance can also mean that operation of the domestic appliance is permitted, and that switching off the domestic appliance can also mean that the domestic appliance is put into a safe and/or non-operable state. For example, the domestic appliance is a hob and, in the safe state, all cooking zones are set to warming. For example, the domestic appliance comprises a range hood, automatically controlling the domestic appliance on the basis of the information acquired on the surroundings of the domestic appliance comprising automatically switching the range hood on and off depending on the degree to which a window is open. For example, gestural control can be implemented by means of automatically controlling the domestic appliance on the basis of the information acquired on the surroundings of the domestic appliance. For example, automatically controlling the domestic appliance on the basis of the information acquired on the surroundings of the domestic appliance comprises automatically adjusting display settings of a display, such as the font size, and/or automatically adjusting the volume of an acoustic reproduction by means of the domestic appliance depending on the distance of a user from the domestic appliance.

In another embodiment of the method according to the invention, the radio signal is intended for transmission within a local radio network and/or complies with the IEEE 802.11 standard, the IEEE 802.154 standard or the Bluetooth standard. In particular, the radio signal is emitted by an at least temporarily stationary WLAN router, another domestic appliance or a mobile telephone. A plurality of radio signals complies with the IEEE 802.11 standard, the IEEE 802.154 standard and/or the Bluetooth standard. Thus, the method can be carried out in many different, but every-day, environments.

The method according to the invention is further developed in that the domestic appliance detects local operational actions of a user on the domestic appliance, information on the surroundings of the domestic appliance additionally being determined by evaluating the detected local operational actions. The local operational actions of the user on the domestic appliance may for example comprise the user operating buttons or actuating buttons on the domestic appliance. In this way, a state and/or a change of the evaluation signal brought about by a person in the surroundings of the domestic appliance can be reliably detected. A learning function can therefore be implemented which allows the domestic appliance to deem states and/or changes of the evaluation signal as having been caused by a person in the surroundings of the domestic appliance.

In an embodiment, the present invention provides a control device of the type mentioned at the outset, the control device comprising an evaluation unit which is designed to evaluate the temporal progression of an evaluation signal based on the radio signal and influenced by the surroundings of the domestic appliance in order to determine information on the surroundings of the domestic appliance.

In a particularly preferred embodiment of the control device according to the invention, the control device is designed to carry out a method for operating a domestic appliance according to any of the above-described embodiments. With regard to the advantages of and modifications to the control device according to the invention, reference is made to the advantages of and modifications to the method according to the invention.

The object of the invention is further achieved by means of a domestic appliance of the type mentioned at the outset, the control device being designed according to any of the above-described embodiments. With regard to advantages of and modifications to the domestic appliance according to the invention, reference is made to the advantages of and modifications to the method according to the invention.

In an embodiment, the present invention provides a system of the type mentioned at the outset, the domestic appliance being designed according to any of the above-described embodiments. With regard to the advantages of and modifications to the system according to the invention, reference is made to the advantages of and modifications to the method according to the invention. The radio transmission source may in this case be designed as a radio transmitter of a local radio network and/or as a radio transmitter which is configured to emit a radio signal that complies with the IEEE 802.11 standard, the IEEE 802.154 standard or the Bluetooth standard. The radio transmission source may also be designed as a transmission module which is positioned in a room of a building and/or is based on the Bluetooth Low Energy standard. A transmission module of this kind may be a transmission module that is based on beacon technology and is in particular designed to be retrofitted in three-dimensional structures. For example, the transmission module comprises an attachment portion for attachment to a room wall, it being possible for the attachment portion to comprise adhesives.

The system may also comprise a plurality of domestic appliances which mutually exchange received radio signals, generated evaluation signals and/or information on the surroundings thereof. This produces additional spatial information, by means of which triangulation operations, for example, can be carried out, and as a result, realistic movement profiles can be created.

FIG. 1 shows a system 10 comprising a domestic appliance 12 and a radio transmission source 14 that is arranged remotely from the domestic appliance 12.

The system 10 is positioned inside a room 100. The radio transmission source 14 is designed as a WLAN router and emits radio signals. The radio signals emitted by the radio transmission source 14 are intended for transmission within a local radio network and comply with the IEEE 802.11 standard. The radio signals emitted by the radio transmission source 14 are received by the domestic appliance 12.

The radio signals received by the domestic appliance 12 reach the domestic appliance 12 via various signal paths 16a-16e. The signal path 16a corresponds to direct transmission between the radio transmission source 14 and the domestic appliance 12. The signal paths 16b-16e comprise a reflection off a wall 106 of the room 100.

The domestic appliance 12 is designed to evaluate the temporal progression of an evaluation signal based on the radio signal and influenced by the surroundings of the domestic appliance 12 in order to determine information on the surroundings of the domestic appliance 12.

For this purpose, the domestic appliance 12 examines the evaluation signal for characteristics of multipath reception. The domestic appliance 12 is designed to detect reflections, refractions, scattering, diffractions, attenuations and amplifications of the radio signal caused by an object in the surroundings of the domestic appliance 12.

The objects 102a-102c in the form of doors, the object 104 in the form of a window and the object 108 are arranged in the surroundings of the domestic appliance 12, the object 108 being a user operating the domestic appliance 12.

The domestic appliance 12 is able to detect the degree to which the objects 102a-102c, 104 are open by evaluating the temporal progression of the evaluation signal. Furthermore, by means of evaluating the temporal progression of the evaluation signal, the user 108 can be located and identified. Moreover, the domestic appliance 12 can detect movements of the user 108 by evaluating the evaluation signal. Furthermore, local operational actions of the user 108 on the domestic appliance 12, such as actuating an appliance button, are detected and additionally taken into account when determining information on the surroundings of the domestic appliance 12. This makes possible a learning function which allows the domestic appliance 12 to deem states and changes of the evaluation signal as having been caused by a person in the surroundings of the domestic appliance 12.

Figure 2:
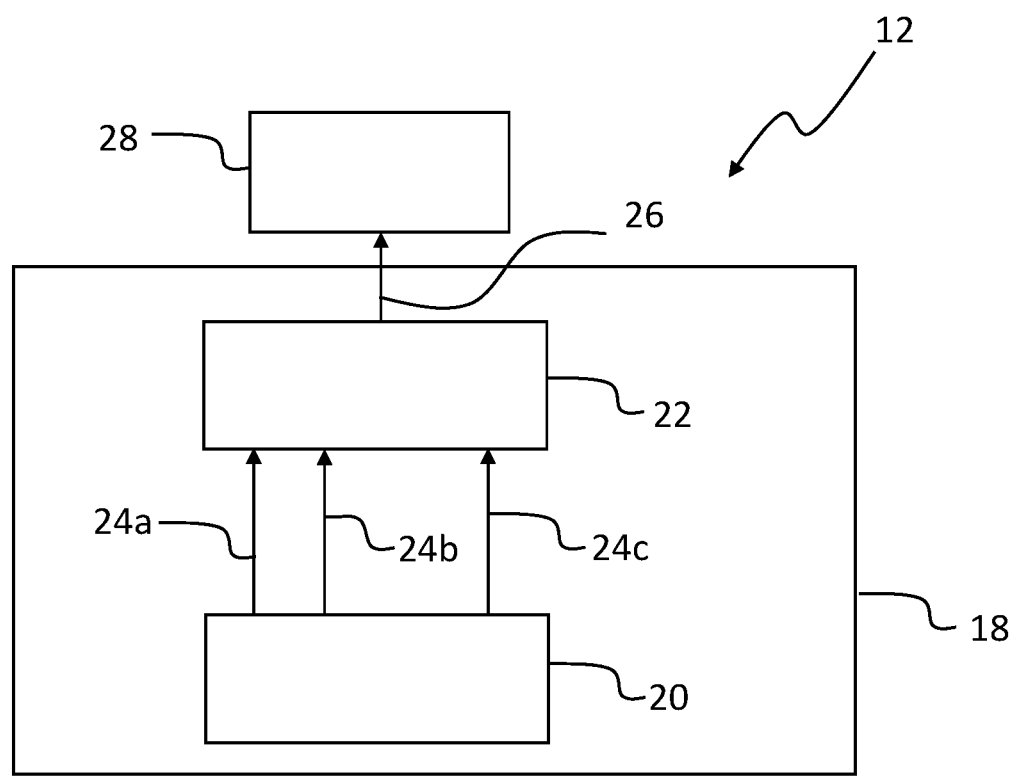
FIG. 2 schematically shows an embodiment of the domestic appliance according to the invention.

FIG. 2 shows a domestic appliance 12 comprising a control device 18. The control device 18 comprises a receiving unit 20 and an evaluation unit 22.

The receiving unit 20 is designed to receive a radio signal from a radio transmission source. The evaluation unit 22 is designed to evaluate the temporal progression of three different evaluation signals 24a-24c based on the radio signal and influenced by the surroundings of the domestic appliance 12 in order to determine information on the surroundings of the domestic appliance 12.

For this purpose, the control device 18 generates the three evaluation signals 24a-24c on the basis of the received radio signal. The evaluation signal 24a is the Receive Signal Strength Indicator (RSSI) value. The RSSI value is generated from a preamplification factor and the received radio signal. The evaluation signal 24b is an equalizer value, which is produced by generating and inverting the channel profile of the received radio signal. The evaluation signal 24c may for example be the received radio signal or another signal generated on the basis of the received radio signal.

The evaluation unit 22 generates a control command 26 for a functional unit 28 of the domestic appliance 12 on the basis of the information on the surroundings of the domestic appliance 12 derived from the radio signal, such that the functional unit 28 of the domestic appliance 12 is controlled automatically on the basis of the information acquired on the surroundings of the domestic appliance 12. The functional unit 28 may for example be a display, a loud speaker or a module for supplying power to the domestic appliance 12.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 10 system
12 domestic appliance
14 radio transmission source
16a-16e signal paths
18 control device
20 receiving unit
22 evaluation unit
24a-24c evaluation signals
26 control command
28 functional unit
100 room
102a-102c objects
104 object
106 wall
108 object

What is claimed is:

1. A method for operating a domestic appliance, comprising the steps of:
   receiving, using the domestic appliance, a radio signal from at least one radio transmission source; and
   determining, using the domestic appliance, information on surroundings of the domestic appliance by evaluating a temporal progression of an evaluation signal based on the radio signal and influenced by the surroundings of the domestic appliance,
   wherein the radio signal is configured for transmission within a local radio network and/or complies with the IEEE 802.11 standard, the IEEE 802.154 standard, or the Bluetooth standard, and
   wherein evaluating the temporal progression of the evaluation signal comprises detecting reflection, refraction, scattering, diffraction, attenuation, and/or amplification of the radio signal caused by an object in the surroundings of the domestic appliance before the radio signal is received by the domestic appliance.

2. The method according to claim 1, wherein the surroundings of the domestic appliance comprise a region within which it is possible for a user of the domestic appliance to operate the domestic appliance locally using operating elements thereof.

3. The method according to claim 1, wherein evaluating the temporal progression of the evaluation signal comprises examining the evaluation signal for multipath reception and/or for characteristics of multipath reception.

4. The method according to claim 1, wherein determining information on the surroundings of the domestic appliance comprises at least one of the following steps:
   detecting a presence of an object in the surroundings of the domestic appliance;
   detecting a movement of an object in the surroundings of the domestic appliance;
   locating an object in the surroundings of the domestic appliance;
   identifying an object in the surroundings of the domestic appliance;
   detecting a state of an object in the surroundings of the domestic appliance;
   detecting a state change in the surroundings of the domestic appliance.

5. The method according to claim 1, further comprising the step of:
   generating the evaluation signal on the basis of the received radio signal, the generating the evaluation signal on the basis of the received radio signal comprising at least one of the following steps:
      examining an indicator value for a reception strength of the received radio signal;
      calculating a channel profile of the received radio signal;
      examining a temporal variation of the channel profile;
      inverting the channel profile of the received radio signal;
      examining the temporal variation of the inverted channel profile.

6. The method according to claim 1, further comprising the step of:
   automatically controlling the domestic appliance on the basis of the information acquired on the surroundings of the domestic appliance.

7. The method according to claim 1, further comprising the steps of:
   detecting, by means of the domestic appliance, local operational actions of a user on the domestic appliance; and
   additionally determining information on the surroundings of the domestic appliance by evaluating the detected local operational actions.

8. A control device for a domestic appliance, comprising:
   a receiving unit configured to receive a radio signal from at least one radio transmission source; and
   an evaluation unit configured to evaluate a temporal progression of an evaluation signal based on the radio signal and influenced by surroundings of the domestic appliance in order to determine information on the surroundings of the domestic appliance,
   wherein the control device is configured to carry out a method for operating a domestic appliance, the method comprising the steps of:
      receiving, using the domestic appliance, a radio signal from at least one radio transmission source; and
      determining, using the domestic appliance, information on surroundings of the domestic appliance by evaluating a temporal progression of an evaluation signal based on the radio signal and influenced by the surroundings of the domestic appliance,
      wherein the radio signal is configured for transmission within a local radio network and/or complies with the IEEE 802.11 standard, the IEEE 802.154 standard, or the Bluetooth standard.

9. A domestic appliance, comprising:
the control device according to claim 8.

10. A system, comprising:
the domestic appliance according to claim 9; and
at least one radio transmission source that is arranged remotely from the domestic appliance.

11. A method for operating a domestic appliance, comprising the steps of:
- receiving, using the domestic appliance, a radio signal from at least one radio transmission source; and
- determining, using the domestic appliance, information on surroundings of the domestic appliance by evaluating a temporal progression of an evaluation signal based on the radio signal and influenced by the surroundings of the domestic appliance; and
- generating the evaluation signal on the basis of the received radio signal, the generating the evaluation signal on the basis of the received radio signal comprising at least one of the following steps:
  - examining an indicator value for a reception strength of the received radio signal;
  - calculating a channel profile of the received radio signal;
  - examining a temporal variation of the channel profile;
  - inverting the channel profile of the received radio signal;
  - examining the temporal variation of the inverted channel profile,
- wherein the radio signal is configured for transmission within a local radio network and/or complies with the IEEE 802.11 standard, the IEEE 802.154 standard, or the Bluetooth standard.

12. The method according to claim 11, wherein the surroundings of the domestic appliance comprise a region within which it is possible for a user of the domestic appliance to operate the domestic appliance locally using operating elements thereof.

13. The method according to claim 11, wherein evaluating the temporal progression of the evaluation signal comprises examining the evaluation signal for multipath reception and/or for characteristics of multipath reception.

14. The method according to claim 11, wherein evaluating the temporal progression of the evaluation signal comprises detecting reflection, refraction, scattering, diffraction, attenuation, and/or amplification of the radio signal caused by an object in the surroundings of the domestic appliance before the radio signal is received by the domestic appliance.

15. The method according to claim 11, wherein determining information on the surroundings of the domestic appliance comprises at least one of the following steps:
- detecting a presence of an object in the surroundings of the domestic appliance;
- detecting a movement of an object in the surroundings of the domestic appliance;
- locating an object in the surroundings of the domestic appliance;
- identifying an object in the surroundings of the domestic appliance;
- detecting a state of an object in the surroundings of the domestic appliance;
- detecting a state change in the surroundings of the domestic appliance.

16. The method according to claim 11, further comprising the step of:
- automatically controlling the domestic appliance on the basis of the information acquired on the surroundings of the domestic appliance.

17. The method according to claim 11, further comprising the steps of:
- detecting, by means of the domestic appliance, local operational actions of a user on the domestic appliance; and
- additionally determining information on the surroundings of the domestic appliance by evaluating the detected local operational actions.

* * * * *